(12) United States Patent
Chen et al.

(10) Patent No.: US 11,680,838 B2
(45) Date of Patent: Jun. 20, 2023

(54) MOVING DEVICE FOR THREE-DIMENSIONAL (3D) SCANNER

(71) Applicant: ZHOUSHAN INSTITUTE OF CALIBRATION AND TESTING FOR QUALITY AND TECHNOLOGY SUPERVISION, Zhoushan (CN)

(72) Inventors: Xianlei Chen, Zhoushan (CN); Junxue Chen, Zhoushan (CN); Cunjun Li, Zhoushan (CN); Huadong Hao, Zhoushan (CN); Haolei Shi, Zhoushan (CN); Zenan Wu, Zhoushan (CN); Yeyong Wang, Zhoushan (CN); Liang Li, Zhoushan (CN); Huan Liu, Zhoushan (CN); Hui Hong, Zhoushan (CN); Yingying Wang, Zhoushan (CN); Chenghao Liu, Zhoushan (CN)

(73) Assignee: ZHOUSHAN INSTIUTE OF CALIBRATION AND TESTING FOR QUALITY AND TECHNOLOGY SUPERVISION, Zhoushao (CN)

( * ) Notice: Subject to any disclaimer, the term of this patent is extended or adjusted under 35 U.S.C. 154(b) by 0 days.

(21) Appl. No.: 17/964,112

(22) Filed: Oct. 12, 2022

(65) Prior Publication Data
US 2023/0036886 A1 Feb. 2, 2023

Related U.S. Application Data

(63) Continuation of application No. PCT/CN2022/114752, filed on Aug. 25, 2022.

(30) Foreign Application Priority Data

Sep. 9, 2021 (CN) .......................... 202111054574.3

(51) Int. Cl.
*G01F 17/00* (2006.01)
*G01N 29/22* (2006.01)
(Continued)

(52) U.S. Cl.
CPC ........... *G01F 17/00* (2013.01); *G01N 29/225* (2013.01); *G01N 29/265* (2013.01); *G01B 21/20* (2013.01)

(58) Field of Classification Search
CPC ..... G01F 17/00; G01N 29/225; G01N 29/265
See application file for complete search history.

(56) References Cited

FOREIGN PATENT DOCUMENTS

| CN | 106442738 A | * | 2/2017 | ............... B08B 5/02 |
| CN | 208210093 U | | 12/2018 | |

(Continued)

*Primary Examiner* — Paul M. West

(57) ABSTRACT

A moving device for a three-dimensional scanner, including a main body, a moving mechanism, a round tube, a driving mechanism and a fixing mechanism. A connecting rod is vertically fixed on an upper side of the main body. The moving mechanism is configured to drive the main body to move. The round tube is sleevedly provided on an outer side of the connecting rod. A fixing sleeve is vertically fixed on an inner side wall of the round tube. A sliding rod is insertedly provided in the fixing sleeve. A lower end of the sliding rod is fixedly connected to the main body, and an upper end extends to be below the 3D scanner and is provided with a top plate. When the round tube moves upward to an outer side of the 3D scanner, the round tube is fixed by the fixing mechanism.

9 Claims, 7 Drawing Sheets

(51) Int. Cl.
*G01N 29/265* (2006.01)
*G01B 21/20* (2006.01)

(56) References Cited

FOREIGN PATENT DOCUMENTS

| | | | |
|---|---|---|---|
| CN | 110081831 A | | 8/2019 |
| CN | 209469980 U | | 10/2019 |
| CN | 210243839 U | * | 4/2020 |
| CN | 210571843 U | | 5/2020 |
| CN | 210953120 U | * | 7/2020 |
| CN | 112174044 A | | 1/2021 |
| CN | 212338678 U | | 1/2021 |
| CN | 213396941 U | * | 6/2021 |

* cited by examiner

MOVING DEVICE FOR THREE-DIMENSIONAL (3D) SCANNER

CROSS-REFERENCE TO RELATED APPLICATIONS

This application is a continuation of International Patent Application No. PCT/CN2022/114752, filed on Aug. 25, 2022, which claims the benefit of priority from Chinese Patent Application No. 202111054574.3, filed on Sep. 9, 2021. The content of the aforementioned application, including any intervening amendments thereto, is incorporated herein by reference in its entirety.

TECHNICAL FIELD

This application relates to measurement auxiliary equipment, and more particularly to a moving device for a three-dimensional (3D) scanner.

BACKGROUND

Due to the large size, the hazardous chemical storage tank is commonly measured by a three-dimensional (3D) scanner for the inside capacity. The 3D scanner is expensive and has a high maintenance cost, so it is required to avoid impacts as much as possible when moving. At present, the 3D scanner is carried mainly by manual handling or by using a trolley.

Regarding the manual handling, the 3D scanner can be placed in a storage box, and then the operator leads the storage box directly into the tank. After reaching the measurement position, the storage box is opened and the 3D scanner is installed. In this way, the collision can be avoided during the transporting process, but it is time-consuming and laborious. Moreover, considering that the interior of the tank is relatively closed with insufficient light and fresh air, it is very dangerous for the operators to work in such a condition for a long time.

With the help of a tool such as a trolley, the 3D scanner is directly installed on the movable trolley, and the operator can directly control the movable trolley to enter the inside of the tank without entering the tank personally, and move to the designated position. Nevertheless, the existing movable trolley has simple structure, and fails to provide enough protection for the 3D scanner. In addition, the trolley is prone to collision with members such as heating pipes, pipe brackets, and cathode and anode blocks inside the tank, causing damage to the 3D scanner. In addition, the moving trolleys may be stuck by such members, hindering the normal motion.

SUMMARY

An objective of this application is to provide a moving device for a three-dimensional (3D) scanner, which can quickly move the 3D scanner to a designated position in a storage tank, and protect the 3D scanner from collision, improving the safety and reliability.

Technical solutions of this application are described as follows.

This application provides a moving device for a three-dimensional scanner, comprising:
a main body;
a moving mechanism;
a first round tube;
a driving mechanism; and
a fixing mechanism;
wherein a connecting rod is vertically fixed on an upper side of the main body, and configured for installation of the 3D scanner;
the moving mechanism is provided at a bottom of the main body, and is configured to drive the main body to move;
the first round tube is sleevedly provided on an outer side of the connecting rod; a fixing sleeve is vertically fixed on a lower edge of an inner side wall of the first round tube; a sliding rod is insertedly provided in the fixing sleeve; a lower end of the sliding rod is fixedly connected to the main body, and an upper end of the sliding rod is below the 3D scanner, and is fixedly provided with a first top plate;
the driving mechanism is provided on the main body, and is configured to drive the first round tube to slide vertically along the sliding rod;
the fixing mechanism is arranged on the first round tube, and is configured to fix the first round tube, when the first round tube slides upward to an outer side of the 3D scanner;
the fixing mechanism comprises a second round tube and four tensioning structures; the second round tube is provided on an outer side of the first round tube through a linkage structure; and the linkage structure is configured to allow the second round tube to simultaneously move upward and rotate when the first round tube slides upward; and
the four tensioning structures are circumferentially provided on an outer side wall of an upper end of the second round tube; and the four tensioning structures are configured to fix the second round tube when the first round tube slides upward to the outer side of the 3D scanner.

In an embodiment, the linkage structure comprises two linkage assemblies; the two linkage assemblies are symmetrically arranged at the outer side of the first round tube; each of the two linkage assemblies comprises:
an inclined chute; and
a horizontal rod;
wherein the inclined chute is provided on an inner side wall of the second round tube obliquely counterclockwise; and
the horizontal rod is radially fixed at a middle of an outer side wall of the first round tube; a free end of the horizontal rod extends into the inclined chute; a guide wheel is coaxially and rotatably provided at the free end of the horizontal rod; and a wheel surface of the guide wheel is in contact with two side walls of the inclined chute.

In an embodiment, an upper edge and a lower edge of the inner side wall of the second round tube are respectively provided with a support structure; the support structure comprises a plurality of support rollers; the plurality of support rollers are circumferentially and rotatably provided on the inner side wall of the second round tube; an axial direction of each of the plurality of support rollers is parallel to an axial direction of the second round tube; and a surface of each of the plurality of support rollers is always in contact with the outer side wall of the first round tube.

In an embodiment, each of the four tensioning structures comprises a pull rope; one end of the pull rope is fixedly connected to the outer side wall of the upper end of the second round tube, and the other end of the pull rope extends clockwise and downward along the outer side wall of the second round tube to be fixedly connected to the upper side of the main body; and the pull rope is always kept in a tension state.

In an embodiment, the driving mechanism comprises:
an inner threaded sleeve;
a screw rod; and a first motor;

wherein the inner threaded sleeve is vertically fixed on the lower edge of the inner side wall of the first round tube;

the screw rod is threadedly connected with the inner threaded sleeve; an upper end of the screw rod is below the 3D scanner, and is fixedly provided with a second top plate; and a lower end of the screw rod is rotatably provided on the upper side of the main body; and a cavity is provided in the main body; the first motor is fixedly provided in the cavity; and the screw rod is connected to the first motor for transmission.

In an embodiment, the moving mechanism comprises four moving structures; the four moving structures are respectively provided on four corners of a lower side of the main body in a symmetrical manner;

each of the four moving structures comprises:

a driving shaft; and a servo motor;

wherein the driving shaft is rotatably provided on the lower side of the main body through a support plate; and a Mecanum wheel is fixedly provided at one end of the driving shaft; and the servo motor is fixedly provided on the lower side of the main body; and an output shaft of the servo motor is fixedly connected to the other end of the driving shaft.

In an embodiment, the main body is further provided with a guiding mechanism; and the guiding mechanism comprises:

an annular groove;

a plurality of rotating shafts; and a transmission structure;

wherein the annular groove is provided on four sides of the main body;

the plurality of rotating shafts are vertically and rotatably provided in the annular groove along a circumferential direction of the annular groove, wherein an upper end of each of the plurality of rotating shafts is provided on an upper side wall of the annular groove, a lower end of each of the plurality of rotating shafts extends out of a lower side wall of the annular groove to be below the main body; the lower end of each of the plurality of rotating shafts is coaxially and fixedly provided with a rubber wheel; and a wheel surface of the rubber wheel partially protrudes from an outer side of the main body; and the transmission structure is provided in the annular groove, and is configured to drive the plurality of rotating shafts to rotate simultaneously.

In an embodiment, the transmission structure comprises:

a plurality of pulleys;

a transmission belt; and a second motor;

wherein the plurality of pulleys are in one-to-one correspondence with the plurality of rotating shafts; and the plurality of pulleys are coaxially fixed on the plurality of rotating shafts, respectively;

the transmission belt is wound on the plurality of pulleys; and the second motor is fixedly provided on the main body; and the second motor is connected to one of the plurality of rotating shafts for transmission.

In an embodiment, the sliding rod is provided with a limiting flange.

Compared with the prior art, this application has the following beneficial effects:

1. In the initial state, the first round tube is located below the connecting rod, facilitating the installation of the 3D scanner on the upper end of the connecting rod without obstructing the working sight of the 3D scanner, and then the first round tube is driven to slide vertically upward along the sliding rod by the driving mechanism to the outside of the 3D scanner to protect the 3D scanner from being damaged by collision. The moving mechanism drives the main body to move to a designated position inside the tank, which is simple in operation, free from the trouble of manual handling, saving time and effort. Additionally, since the first top plate on the sliding rod is located below the 3D scanner, when the first round tube moves to the outer side of the 3D scanner, the upper end of the first round tube is in a suspended state, and the fixing mechanism is configured to fix the first round tube to prevent the first round tube from shaking due to the collision and hitting the 3D scanner, which is safe and reliable.

2. When the first round tube slides upward along the sliding rod, the linkage structure is configured to drive the second round tube to simultaneously move upward and rotate. When the first round tube slides to the outside of the 3D scanner, the four tensioning structures are configured to fix the second round tube to limit the continuous rotation of the second round tube, restrict the second round tube from continuing to rotate, improve the stability of the first round tube and restrain the first round tube from shaking.

3. When the first round tube slides upward, the horizontal rod moves upward along the inclined chute to allow the second round tube to move upward and rotate simultaneously under the guiding of the inclined chute, which is simple in structure. In addition, the guide wheel on the horizontal rod is always in contract with the two side walls of the inclined chute, allowing the horizontal rod to slide up and down smoothly.

4. Since the upper end and the lower end of the second round tube are circumferentially provided with a plurality of support rollers, and the surface of each of the plurality of support rollers is always in contact with the outer side wall of the first round tube, when the second round tube rotates, the plurality of support rollers roll along the outer side wall of the first round tube to not only support and guide, but also avoid the off axis of the second round tube and the first round tube.

5. In the initial state, the second round tube is located below the 3D scanner. The pull rope is provided around the outer side wall of the second round tube, and is kept in a tension state. When the second round tube moves upward, the length of the pull rope is fixed, such that the second round tube rotates coaxially. When the first round tube slides to the outer side wall of the 3D scanner, the axis of the second round tube is located on the vertical plane where the pull rope is located, such that the second round tube is restricted from continuous rotation, and fixed, and the stability of the first round tube is improved at the same time.

6. The first motor is started to drive the screw rod to rotate to allow the inner threaded sleeve to rotate along with the screw rod. Since the first round tube is limited by the fixing sleeve, the first round tube and the inner threaded sleeve are only configured to move upward and downward, which is simple in structure.

7. Since many obstacles exist inside the tank, the four servo motors are controlled to change the rotation direction of the four Mecanum wheels, so as to allow the main body to move in any direction without turning around, reducing the probability of collision.

8. The transmission structure drives the plurality of rotating shafts to rotate simultaneously, so as to allow the rubber wheel to rotate. Since the wheel surface of the rubber wheel partially protrudes from an outer side of the main body, the rubber wheel is in contact with the obstacle before the main body. The rubber wheel is configured for buffering. In addition, the rubber wheel keeps rotating to allow the main body to quickly leave the obstacle to avoid being stuck, which affects the normal movement.

9. The second motor is started to drive one of the plurality of first shafts to rotate. Since the transmission belt is wound on the plurality of first shafts, one rotating shaft rotates to drive all the plurality of first shafts to rotate simultaneously, which is simple in structure, reducing the cost of the motor.

Figure 1:
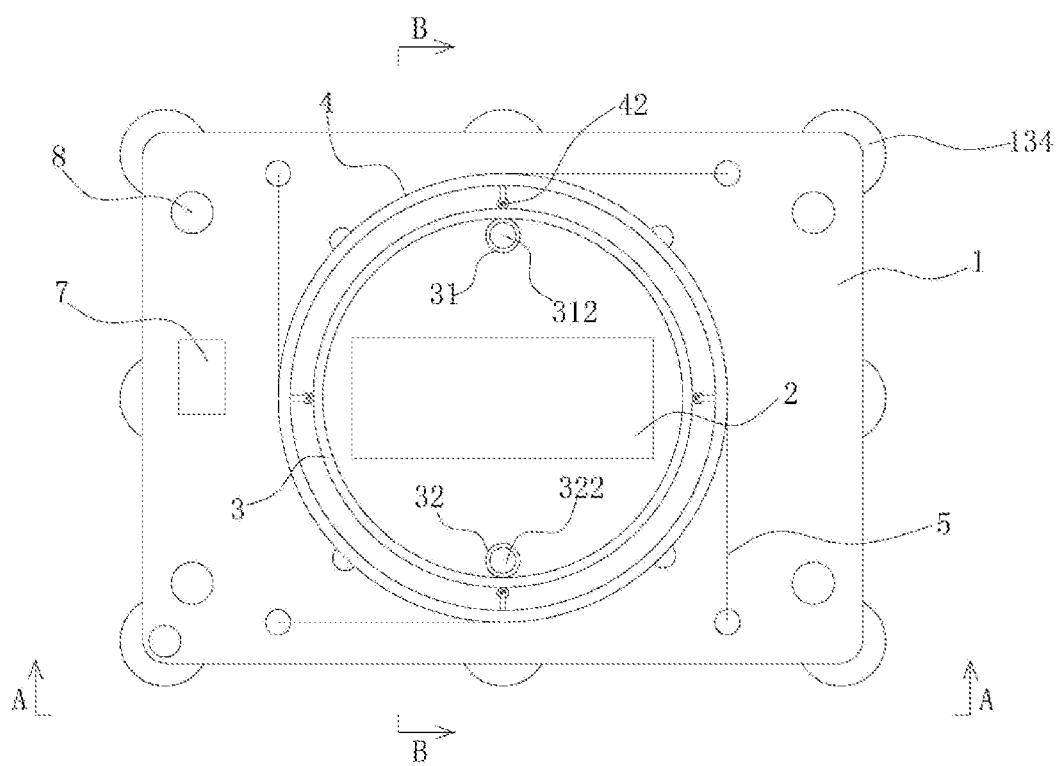
FIG. 1 is a structural diagram of a moving device for a three-dimensional (3D) scanner according to an embodiment of this application.

In the drawings, 1: main body, 11: annular groove, 12: servo motor, 121: Mecanum wheel, 122: driving shaft, 13: rotating shaft, 131: pulley, 132: second motor, 133: transmission belt, 134: rubber wheel, 2: 3D scanner, 21: connecting rod, 3: first round tube, 31: inner threaded sleeve, 311: screw rod, 312: second top plate, 32: fixing sleeve, 321: sliding rod, 322: first top plate, 323: limiting flange, 33: horizontal rod, 34: guide wheel, 4: second round tube, 41: inclined chute, 42: support roller, 5: pull rope, 6: cavity, 61: first motor, 7: controller, and 8: infrared camera.

DETAILED DESCRIPTION OF EMBODIMENTS

This application will be described in detail below with reference to the embodiments and accompanying drawings, but is not limited to the following embodiments.

Figure 2:
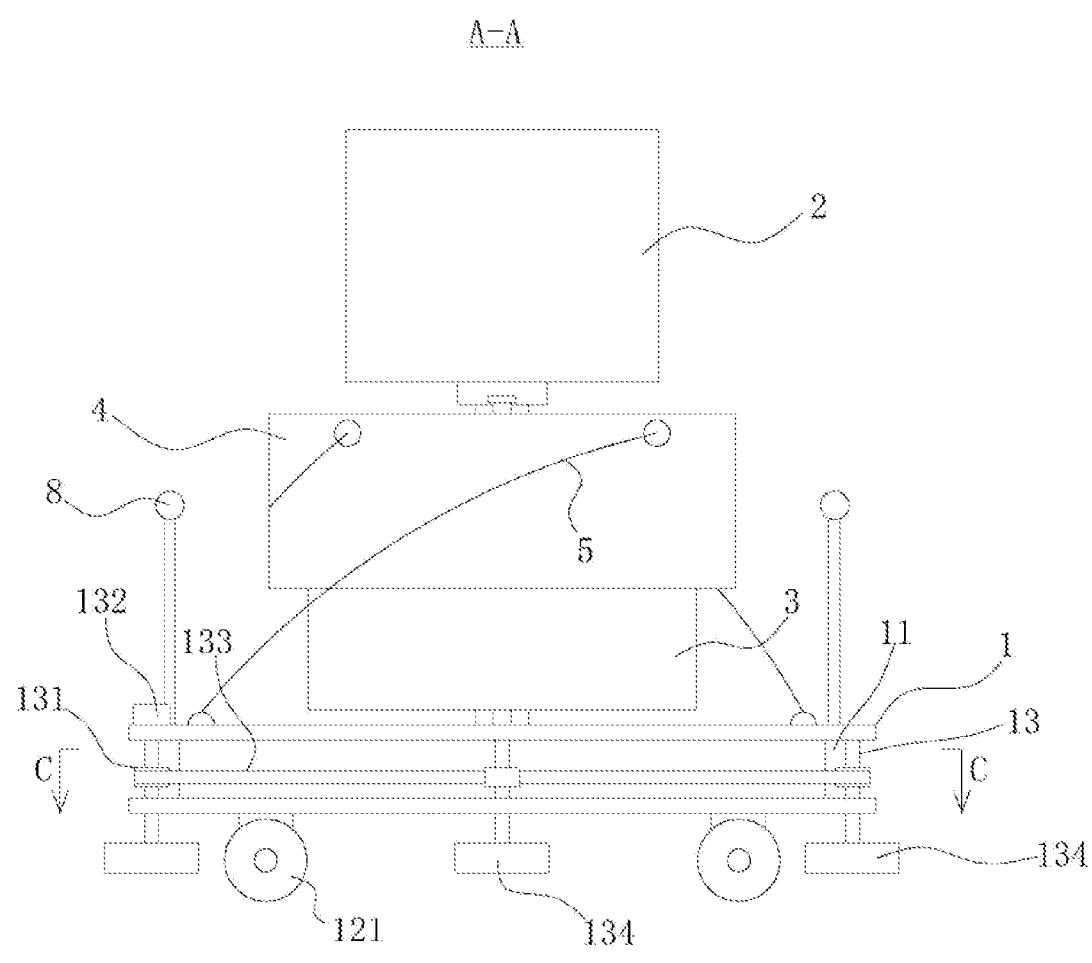
FIG. 2 is a sectional view of the device along line A-A in FIG. 1.
Figure 3:
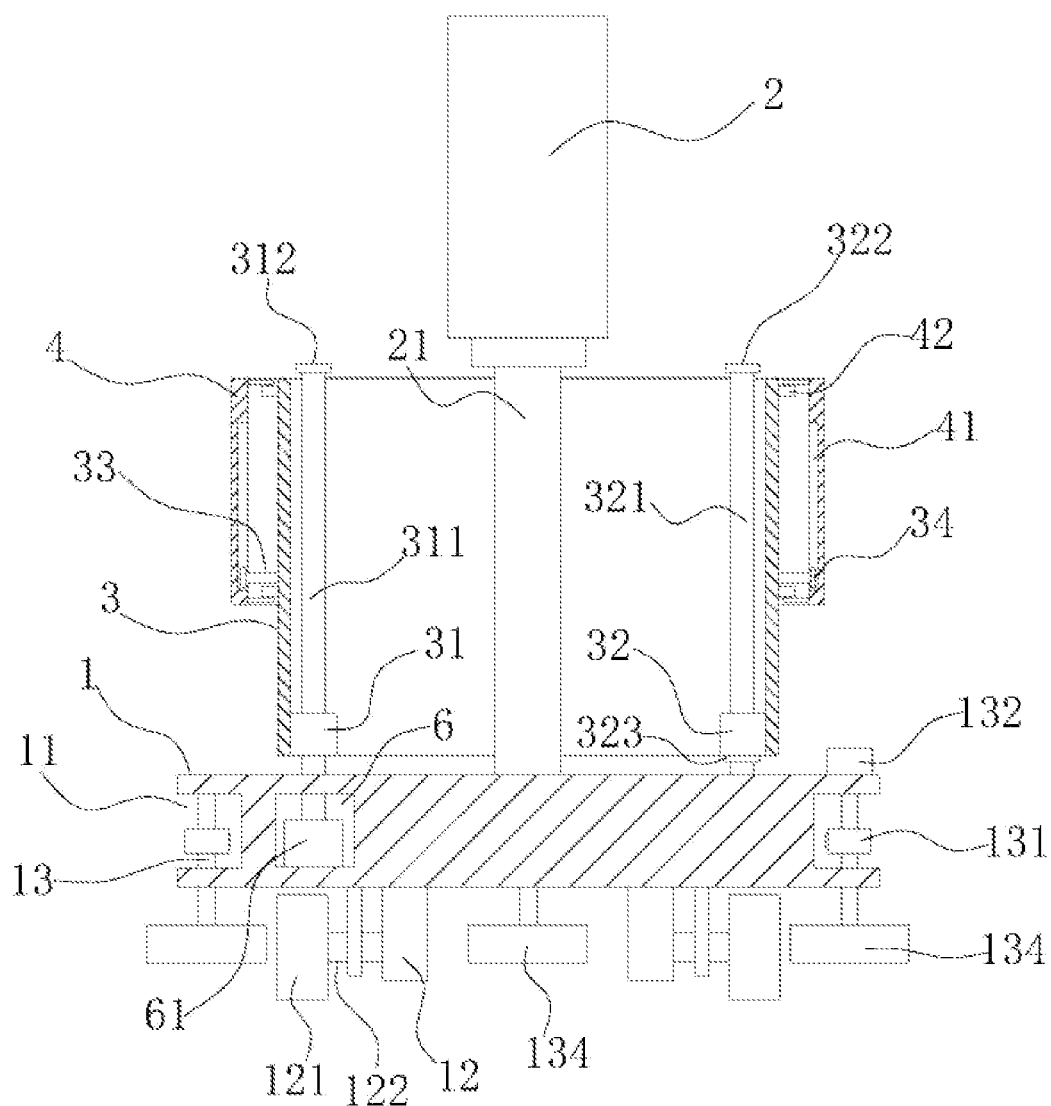
FIG. 3 is a sectional view of the device along line B-B in FIG. 1.
Figure 4:
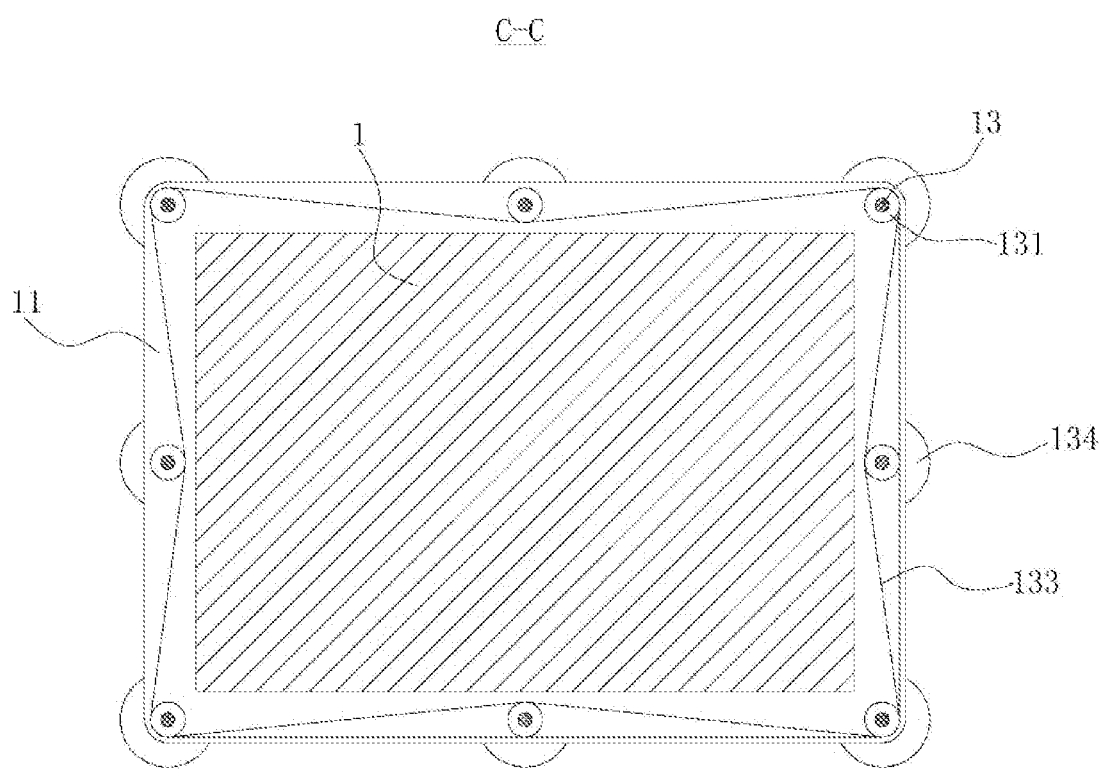
FIG. 4 is a sectional view of the device along line C-C in FIG. 2.
Figure 5:
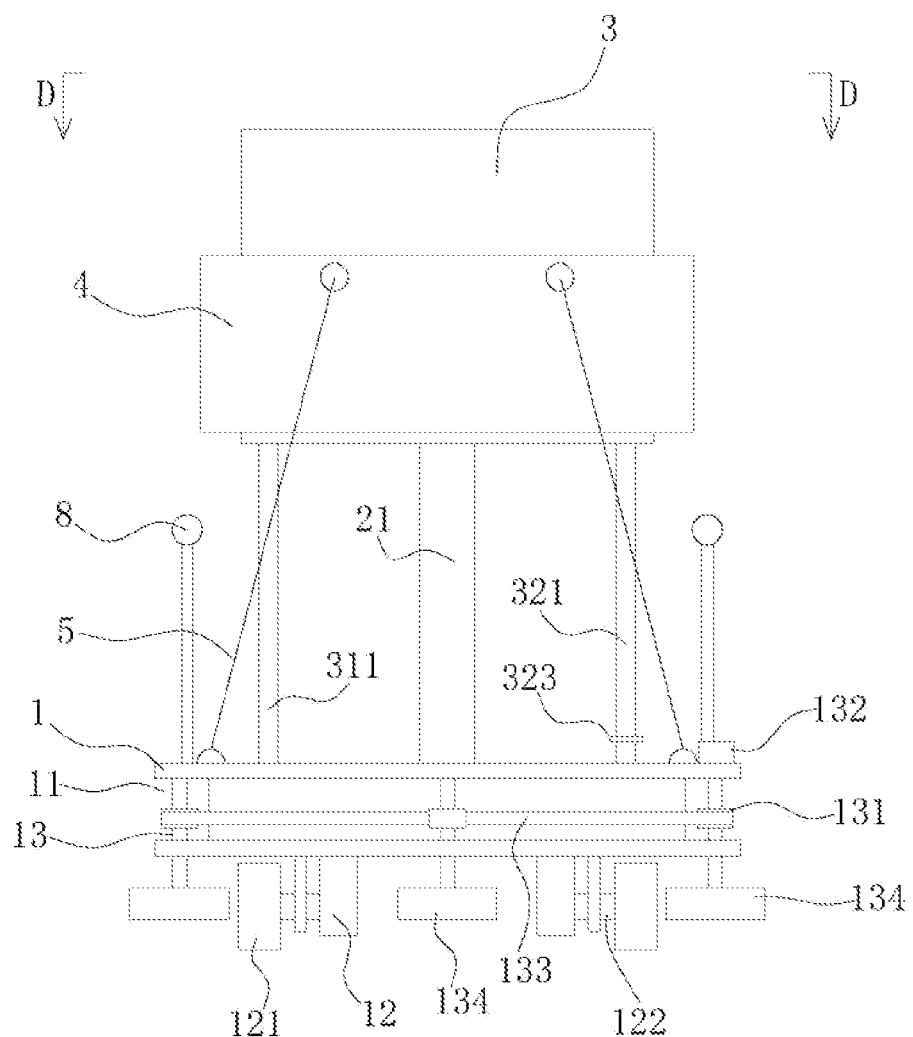
FIG. 5 is a structural diagram of the device when a first round tube moves to an outer side of the 3D scanner.
Figure 6:
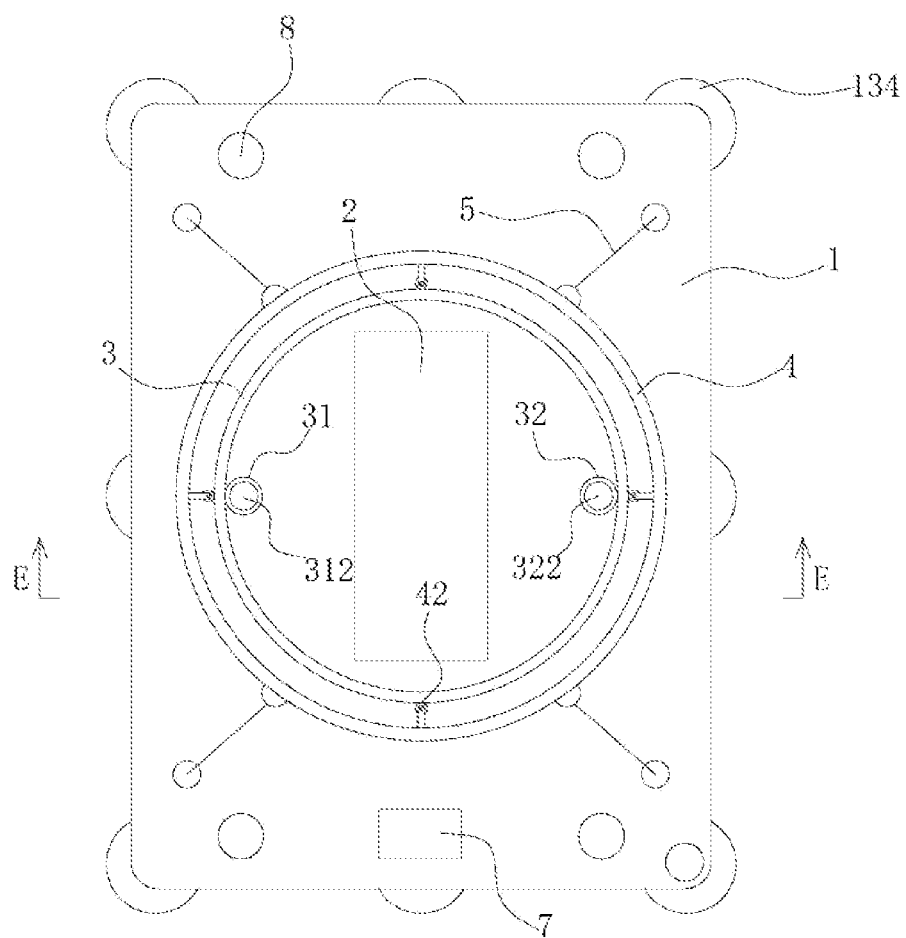
FIG. 6 is a sectional view of the device along line D-D in FIG. 5.
Figure 7:
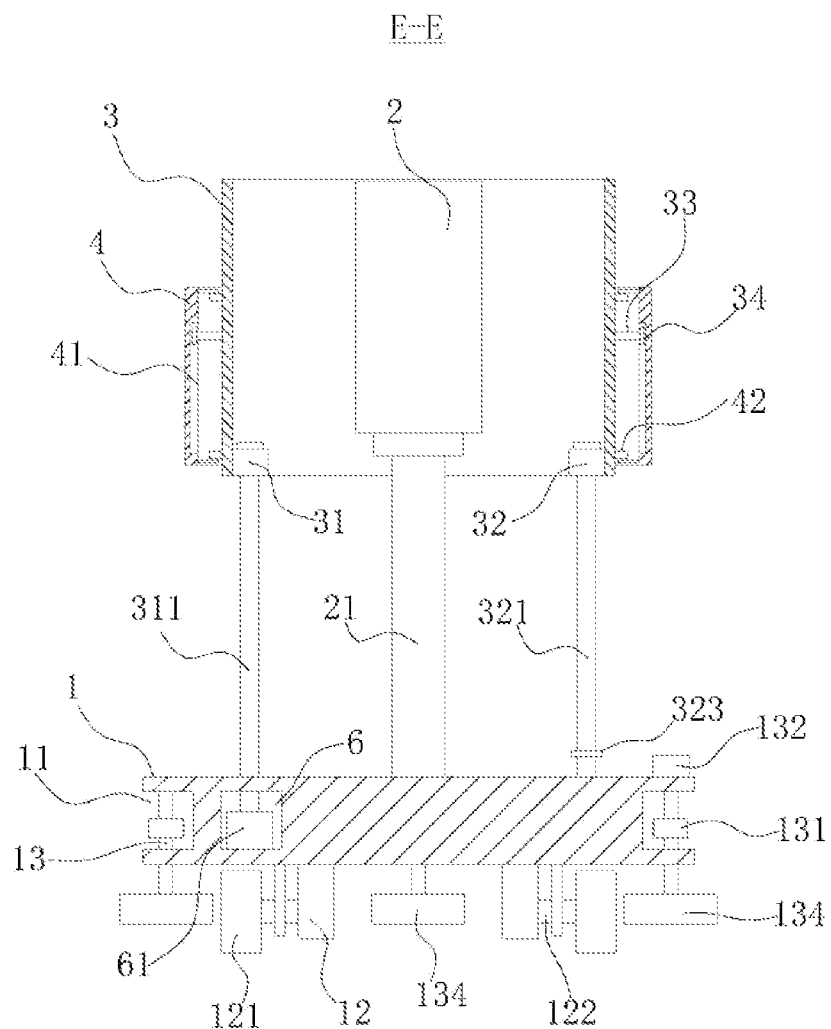
FIG. 7 is a sectional view of the device along line E-E in FIG. 6.
Figure 8:
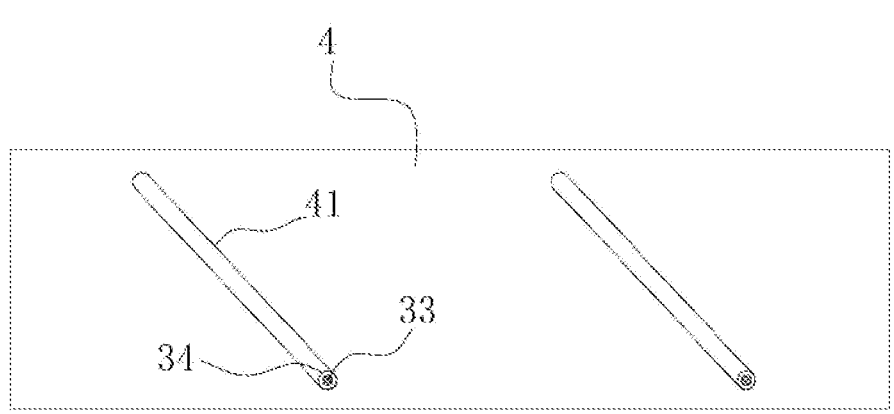
FIG. 8 is an unfolded view of an inner side wall of a second round tube according to an embodiment of this application.

As shown in FIGS. 1-8, a device for moving a three-dimensional (3D) scanner is provided, including a main body 1, a moving mechanism, a first round tube 3, a driving mechanism and a fixing mechanism.

The main body 1 is rectangular. A connecting rod 21 is vertically fixed on a middle part of an upper side of the main body 1, and is configured for installation of the 3D scanner 2. The main body 1 is provided with a controller 7. Four sides of the main body are respectively provided with an infrared camera 8. The infrared camera 8 is configured to output an image around the main body 1 to an external display device.

The moving mechanism is provided at a bottom of the main body 1. and is configured to drive the main body 1 to move.

The first round tube 3 is sleevedly provided on an outer side of the connecting rod 21. A fixing sleeve 32 is vertically fixed on a lower edge of an inner side wall of the first round tube 3. A sliding rod is insertedly provided in the fixing sleeve 321. A lower end of the sliding rod 321 is fixedly connected to the main body 1. An upper end of the sliding rod 321 is below the 3D scanner 2, and is fixedly provided with a first top plate 322. The size of the first top plate 322 is larger than a hole diameter of the fixing sleeve 32.

The driving mechanism is provided on the main body 1, and is configure to drive the first round tube 3 to slide vertically upward and downward along the sliding rod 321.

The fixing mechanism is provided on the first round tube 3. and is configured to fix the first round tube 3 when the first round tube 3 slides upward to an outer side of the three-dimensional scanner 2.

In an initial state, the first round tube 3 is located below the connecting rod 21, facilitating the installation of the 3D scanner 2 on an upper end of the connecting rod 21 without obstructing the working sight of the 3D scanner 2, and then the first round tube 3 is driven to slide vertically upward along the sliding rod by the driving mechanism to the outside of the 3D scanner to protect the 3D scanner 2 from being damaged by collision. The moving mechanism drives the main body 1 to move to a designated position inside the tank, which is simple in operation, free from the trouble of manual handling, saving time and effort. Additionally, since the first top plate 322 on the sliding rod 321 is located below the 3D scanner 2, when the first round tube moves to the outer side of the 3D scanner 2, an upper end of the first round tube 3 is in a suspended state, and the fixing mechanism is configured to fix the first round tube 3 to prevent the first round tube 3 from shaking due to the collision and hitting the 3D scanner 2, which is safe and reliable.

In this embodiment, the fixing mechanism includes a second round tube 4 and four tensioning structures.

The second round tube 4 is provided on an outer side of the first round tube 3 through a linkage structure. The linkage structure is configured to allow the second round tube 4 to simultaneously move upward and rotate when the first round tube 3 slides upward.

The four tensioning structures are circumferentially provided on an outer side wall of an upper end of the second round tube 4. The four tensioning structures are configured to fix the second round tube 4 when the first round tube 3 slides upward to an outer side of the 3D scanner 2.

When the first round tube 3 slides upward along the sliding rod 321, the linkage structure is configured to drive the second round tube 4 to simultaneously move upward and rotate. When the first round tube 3 slides to the outer side of the 3D scanner 2, the four tensioning structures are configured to fix the second round tube 4, restrict the second round tube 4 from continuing to rotate, improve the stability of the first round tube 3 and restrain the first round tube 3 from shaking.

In this embodiment, the linkage structure includes two linkage assemblies. The two linkage assemblies are symmetrically arranged at an outer side of the first round tube 3. Each of the two linkage assemblies includes an inclined chute 41 and a horizontal rod 33.

The inclined chute 41 is provided on an inner side wall of the second round tube 4 obliquely counterclockwise.

The horizontal rod 33 is radially fixed at a middle of an outer side wall of the first round tube 3. A free end of the horizontal rod 33 extends into the inclined chute 41. A guide wheel 34 is coaxially and rotatably provided at the free end of the horizontal rod 33. A wheel surface of the guide wheel 34 is in contact with two side walls of the inclined chute 41.

When the first round tube 3 slides upward, the horizontal rod 33 moves upward along the inclined chute 41 to allow the second round tube 4 to move upward and rotate simultaneously under the guiding of the inclined chute 41, which is simple in structure. In addition, the guide wheel 34 on the horizontal rod 33 is always in contract with the two side walls of the inclined chute 41, allowing the horizontal rod 33 to slide up and down smoothly.

In this embodiment, an upper edge and a lower edge of the inner side wall of the second round tube 4 are respectively provided with a support structure. The support structure includes a plurality of support rollers 42.

The plurality of support rollers 42 are circumferentially and rotatably provided on the inner wall of the second round tube 4. An axial direction of each of the plurality of support rollers 42 is parallel to an axial direction of the second round tube 4. A surface of each of the plurality of support rollers 42 is always in contact with the outer side wall of the first round tube 3.

Since the upper end and the lower end of the second round tube 4 are circumferentially provided with a plurality of support rollers 42, and the surface of each of the plurality of support rollers 42 is always in contact with the outer side wall of the first round tube 3, when the second round tube 4 rotates, the plurality of support rollers 42 roll along the outer side wall of the first round tube 3 to not only support and guide, but also avoid the off axis of the second round tube 4 and the first round tube 3.

In an embodiment, each of the four tensioning structures includes a pull rope 5.

One end of the pull rope 5 is fixedly connected to the outer side wall of the upper end of the second round tube 4, and the other end of the pull rope 5 extends clockwise and downward along the outer side wall of the second round tube 4 to be fixedly connected to the upper side of the main body 1. The pull rope 5 is always kept in a tension state.

In an initial state, the second round tube 4 is located below the 3D scanner 2. The pull rope 5 is looped on the outer side wall of the second round tube 4, and is kept in a tension state. When the second round tube 4 moves upward, the length of the pull rope 5 is fixed, such that the second round tube 4 rotates coaxially. When the first round tube 3 slides to the outer side wall of the 3D scanner 2, the axis of the second round tube 4 is located on a vertical plane where the pull rope 5 is located, such that the second round tube 4 is restricted from continuous rotation, and fixed, and the stability of the first round tube 3 is improved at the same time.

In an embodiment, the driving mechanism includes an inner threaded sleeve 31, a screw rod 311 and a first motor 61.

The inner threaded sleeve 31 is vertically fixed on the lower edge of the inner side wall of the first round tube 3. The inner threaded sleeve 31 is located on a side opposite to the fixing sleeve 32.

The screw rod 311 is threadedly connected with the inner threaded sleeve 31. An upper end of the screw rod 311 is below the 3D scanner 2, and is fixedly provided with a second top plate 312, a lower end of the screw rod 311 is rotatably provided on the upper side of the main body 1.

A cavity 6 is provided in the main body 1. The first motor 61 is fixedly provided in the cavity 6. A lower end of the screw rod 311 extends to the cavity 6 and fixedly connected to an output shaft of the first motor 61. The main body 1 is provided with a controller 7. The controller 7 is electrically connected to the first motor 61.

The first motor 61 is started to drive the screw rod 311 to rotate to allow the inner threaded sleeve 31 to rotate along with the screw rod 311. Since the first round tube 3 is limited by the fixing sleeve 32, the first round tube 3 and the inner threaded sleeve 31 are only configured to move upward and downward, which is simple in structure.

In an embodiment, the moving mechanism includes four moving structures. The four moving structures are respectively provided on four corners of a lower side of the main body 1 in a symmetrical manner. Each of the four moving structures includes a driving shaft 122 and a servo motor 12.

The driving shaft 122 is rotatably provided on the lower side of the main body 1 through a support plate. A Mecanum wheel 121 is fixedly provided at one end of the driving shaft 122.

The servo motor 12 is fixedly provided on the lower side of the main body 1. and an output shaft of the servo motor 12 is fixedly connected to the other end of the driving shaft 122.

Since many obstacles exist inside the tank, the four servo motors 12 are controlled to change the rotation direction of the four Mecanum wheels 121, so as to allow the main body 1 to move in any direction without turning around, reducing the probability of collision.

In this embodiment, the main body 1 is further provided with a guiding mechanism. The guiding mechanism includes an annular groove 11, a plurality of rotating shafts 13 and a transmission structure.

The annular groove 11 is provided on four sides of the main body 1.

The plurality of rotating shafts 13 are vertically and rotatably provided in the annular groove 11 along a circumferential direction of the annular groove 11, where an upper end of each of the plurality of rotating shafts 13 is provided on an upper side wall of the annular groove 11, a lower end of each of the plurality of rotating shafts 13 extends out of a lower side wall of the annular groove 11 to be below the main body 1. The lower end of each of the plurality of rotating shafts 13 is coaxially and fixedly provided with a rubber wheel 134. A wheel surface of the rubber wheel 134 partially protrudes from an outer side of the main body 1.

In an embodiment, the four corners of the main body 1 are respectively provided with a rotating shaft 13. Four rubber wheels respectively partially protrudes from the outer side of a corresponding corner of the main body 1 to prevent the four corners of the main body 1 from being stuck due to the collides with the obstacle.

The transmission structure is provided in the annular groove 11, and is configured to drive the plurality of rotating shafts 13 to rotate simultaneously.

The transmission structure drives the plurality of rotating shafts 13 to rotate at the same time, so as to allow the rubber wheel 134 to rotate. Since the wheel surface of the rubber wheel 134 partially protrudes from the outer side of the main body 1, the rubber wheel 134 is in contact with the obstacle first. The rubber wheel 134 is configured for buffering. In addition, the rubber wheel 134 keeps rotating to allow the main body 1 to quickly leave the obstacle to avoid being stuck, which affects the normal movement.

In this embodiment, the transmission structure includes a plurality of pulleys 131, a transmission belt 133 and a second motor 132.

The plurality of pulleys 131 are in one-to-one correspondence with the plurality of rotating shafts 13. The plurality of pulleys 131 are respectively coaxially fixed on the plurality of rotating shafts 13, respectively.

The transmission belt 133 is wound on the plurality of pulleys 131.

In an embodiment, the transmission belt 133 is wound inside and outside between two adjacent pulleys 131 to prevent the transmission belt 133 from slipping off.

The second motor 132 is fixedly provided on the main body 1. The second motor 132 is connected to one of the plurality of rotating shafts 13 for transmission. The second motor 132 is electrically connected to the controller 7.

The second motor 132 is started to drive one of the plurality of first shafts 13 to rotate. Since the transmission belt is wound on the plurality of first shafts 13, one rotating shaft 13 rotates to drive all the plurality of first shafts 13 to rotate simultaneously, which is simple in structure, reducing the cost of the motor.

In this embodiment, the sliding rod 321 is provided with a limiting flange 323.

When the first round tube 3 slides downward, the fixing sleeve 32 is in contact with the limiting flange 323 to prevent the first round tube 3 from sliding down and contacting the main body 1. The limiting flange 323 and the first top plate 322 are configured to limit a sliding range of the first round tube 3 from up to down, which is simple in structure.

It should be noted that the orientation or positional relationship indicated by the terms, such as "up", "down", "inner" and "outer" is based on the orientation or positional relationship shown in the accompanying drawings, and these terms are merely intended to simplify the description and facilitate the understanding, rather than indicating or implying that the referred device or element must have a particular orientation, or be constructed and operated in a particular orientation, and thus should not be construed as a limitation to this application.

The embodiments described above are merely illustrative of this application, and are not intended to limit this application. It should be understood that various modifications, variations and replacements made by those skilled in the art without departing from the spirit of this application should still fall within the scope of the present application defined by the appended claims.

What is claimed is:

1. A moving device for a three-dimensional (3D) scanner, comprising:
   a main body;
   a moving mechanism;
   a first round tube;
   a driving mechanism; and
   a fixing mechanism;
   wherein a connecting rod is vertically fixed on an upper side of the main body, and configured for installation of the 3D scanner;
   the moving mechanism is provided at a bottom of the main body, and is configured to drive the main body to move;
   the first round tube is sleevedly provided on an outer side of the connecting rod; a fixing sleeve is vertically fixed on a lower edge of an inner side wall of the first round tube; a sliding rod is insertedly provided in the fixing sleeve; a lower end of the sliding rod is fixedly connected to the main body, and an upper end of the sliding rod is below the 3D scanner, and is fixedly provided with a first top plate;
   the driving mechanism is provided on the main body, and is configured to drive the first round tube to slide vertically along the sliding rod;
   the fixing mechanism is arranged on the first round tube, and is configured to fix the first round tube when the first round tube slides upward to an outer side of the 3D scanner;
   the fixing mechanism comprises a second round tube and four tensioning structures; the second round tube is provided on an outer side of the first round tube through a linkage structure; and the linkage structure is configured to allow the second round tube to simultaneously move upward and rotate when the first round tube slides upward; and
   the four tensioning structures are circumferentially provided on an outer side wall of an upper end of the second round tube; and the four tensioning structures are configured to fix the second round tube when the first round tube slides upward to the outer side of the 3D scanner.

2. The device of claim 1, wherein the linkage structure comprises two linkage assemblies; the two linkage assemblies are symmetrically arranged at the outer side of the first round tube;
   each of the two linkage assemblies comprises:
   an inclined chute; and
   a horizontal rod;
   wherein the inclined chute is provided on an inner side wall of the second round tube obliquely counterclockwise; and
   the horizontal rod is radially fixed at a middle of an outer side wall of the first round tube; a free end of the horizontal rod extends into the inclined chute; a guide wheel is coaxially and rotatably provided at the free end of the horizontal rod; and a wheel surface of the guide wheel is in contact with two side walls of the inclined chute.

3. The device of claim 2, wherein an upper edge and a lower edge of the inner side wall of the second round tube are respectively provided with a support structure; the support structure comprises a plurality of support rollers; the plurality of support rollers are circumferentially and rotatably provided on the inner side wall of the second round tube; an axial direction of each of the plurality of support rollers is parallel to an axial direction of the second round tube; and a surface of each of the plurality of support rollers is always in contact with the outer side wall of the first round tube.

4. The device of claim 3, wherein each of the four tensioning structures comprises a pull rope; one end of the pull rope is fixedly connected to the outer side wall of the upper end of the second round tube, and the other end of the pull rope extends clockwise and downward along the outer side wall of the second round tube to be fixedly connected to the upper side of the main body; and the pull rope is always kept in a tension state.

5. The device of claim 1, wherein the driving mechanism comprises:
   an inner threaded sleeve;
   a screw rod; and
   a motor;
   wherein the inner threaded sleeve is vertically fixed on the lower edge of the inner side wall of the first round tube; the screw rod is threadedly connected with the inner threaded sleeve; an upper end of the screw rod is below the 3D scanner, and is fixedly provided with a second top plate; and a lower end of the screw rod is rotatably provided on the upper side of the main body; and
   a cavity is provided in the main body; the motor is fixedly provided in the cavity; and the screw rod is connected to the motor for transmission.

6. The device of claim 1, wherein the moving mechanism comprises four moving structures; the four moving structures are respectively provided on four corners of a lower side of the main body in a symmetrical manner;
   each of the four moving structures comprises:
   a driving shaft; and
   a servo motor;

wherein the driving shaft is rotatably provided on the lower side of the main body through a support plate; and a Mecanum wheel is fixedly provided at one end of the driving shaft; and the servo motor is fixedly provided on the lower side of the main body; and an output shaft of the servo motor is fixedly connected to the other end of the driving shaft.

7. The device of claim 1, wherein the main body is further provided with a guiding mechanism; and the guiding mechanism comprises:

an annular groove;

a plurality of rotating shafts; and a transmission structure;

wherein the annular groove is provided on four sides of the main body;

the plurality of rotating shafts are vertically and rotatably provided in the annular groove along a circumferential direction of the annular groove, wherein an upper end of each of the plurality of rotating shafts is provided on an upper side wall of the annular groove, and a lower end of each of the plurality of rotating shafts extends out of a lower side wall of the annular groove to be below the main body; the lower end of each of the plurality of rotating shafts is coaxially and fixedly provided with a rubber wheel; and a wheel surface of the rubber wheel partially protrudes from an outer side of the main body; and the transmission structure is provided in the annular groove, and is configured to drive the plurality of rotating shafts to rotate simultaneously.

8. The device of claim 7, wherein the transmission structure comprises:

a plurality of pulleys;

a transmission belt; and a motor;

wherein the plurality of pulleys are in one-to-one correspondence with the plurality of rotating shafts; and the plurality of pulleys are coaxially fixed on the plurality of rotating shafts, respectively;

the transmission belt is wound on the plurality of pulleys; and the motor is fixedly provided on the main body; and the motor is connected to one of the plurality of rotating shafts for transmission.

9. The device of claim 1, wherein the sliding rod is provided with a limiting flange.

* * * * *